May 2, 1967 P. V. FLORIDO 3,316,696
COMBINATION LAWN MOWER AND SNOW REMOVER
Filed June 4, 1965 2 Sheets-Sheet 1

INVENTOR
PABLO V. FLORIDO

BY
ATTORNEY

May 2, 1967    P. V. FLORIDO    3,316,696
COMBINATION LAWN MOWER AND SNOW REMOVER
Filed June 4, 1965    2 Sheets-Sheet 2
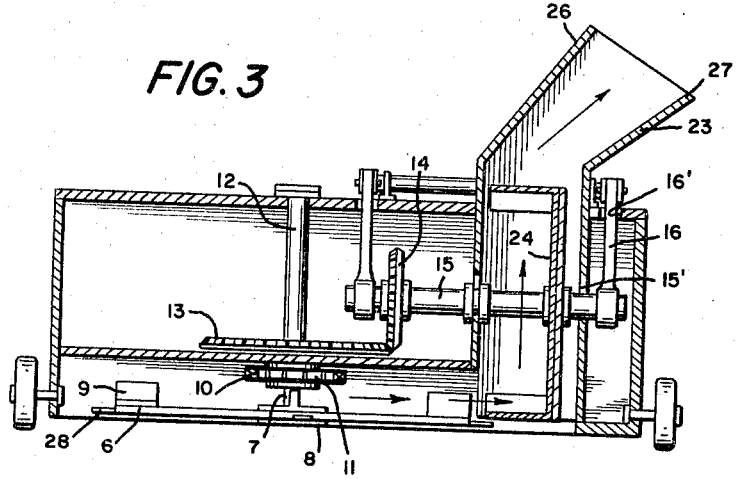
FIG. 3
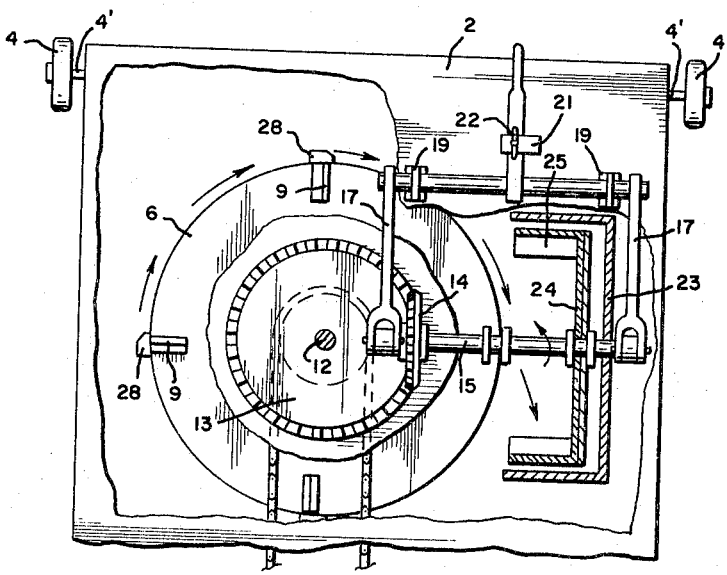
FIG. 4
INVENTOR
PABLO V. FLORIDO
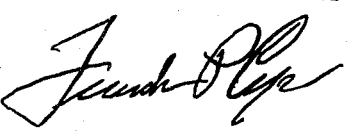
BY
ATTORNEY United States Patent Office 3,316,696
Patented May 2, 1967

3,316,696
COMBINATION LAWN MOWER AND SNOW REMOVER
Pablo V. Florido, 4800 Ravenswood Road, Riverdale, Md. 20840
Filed June 4, 1965, Ser. No. 461,235
5 Claims. (Cl. 56—25.4)

This invention relates to a combination lawn mower and snow remover.

Combination lawn mowers and snow removers are generally known but in most instances, when it is desired to employ the lawn mower as a snow remover, the lawn mower must be modified by the user thereof so as to enable the lawn mower to have secured thereto the proper implements employed for removing the snow.

It is the primary purpose of the present invention to combine a rotary type lawn mower with a snow removal device permanently attached thereto which can be employed as a lawn mower in the summertime for cutting grass and the like and in the wintertime, for the removal of snow without having to secure to the rotary lawn mower an attachment such as have been provided for in the past.

It is another object of the invention to house all of the moving parts of the combination rotary type lawn mower and snow remover under one housing or shroud thereby insuring that all moving parts for the combination rotary lawn mower and snow remover are protected from the elements and likewise increase the safety of the combination lawn mower and snow remover by enclosing all of the moving parts thereof under the aforesaid housing.

Still another object of the invention is to provide a combination rotary lawn mower and snow remover with a manual means which can be actuated for elevating or lowering a gear which is employed for converting the rotary lawn mower into a snow remover.

Still another object of the invention is to provide a plurality of flanges on a conventional rotary disc type cutter blade employed in a rotary cutter and with flanges on a rotating fan-like member which is employed for lifting the snow and throwing it outwardly of the housing through a suitable hood mechanism which is permanently secured to the combination rotary lawn mower and snow remover.

Further objects of this invention reside in a provision of a combination lawn mower and snow remover that is strong and durable, simple in manufacture and construction, highly efficient in operation and is relatively inexpensive to manufacture.

These and other objects of this invention will become more apparent from the description which follows and the accompanying drawings in which:

FIG. 3 is a section taken along lines 3—3 of FIG. 2; and

FIG. 4 is a top plan view partly in section of the apparatus comprising the present invention disclosing in particular the driving means for the rotary blade for cutting the grass and the fan-like member for removing the snow.

Figure 1:
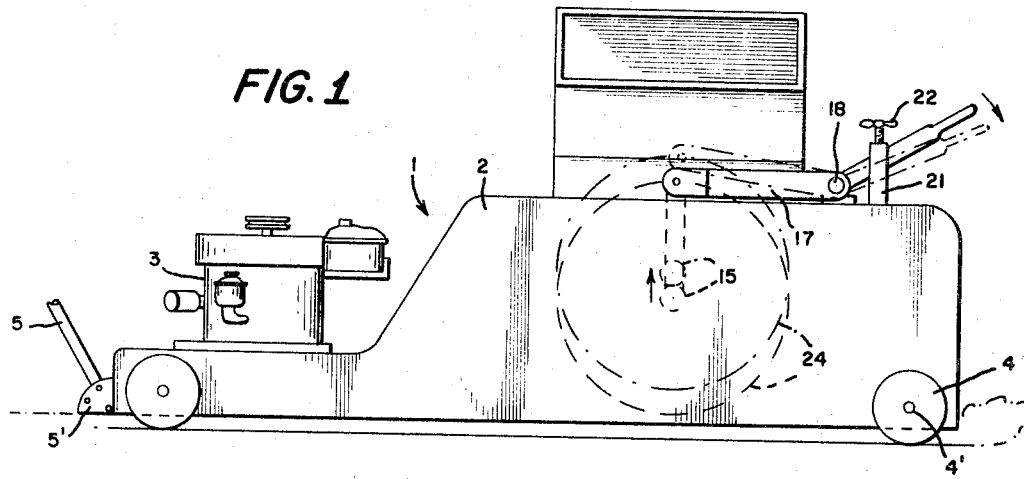
FIG. 1 is a side view of the mower and snow remover.
Figure 2:
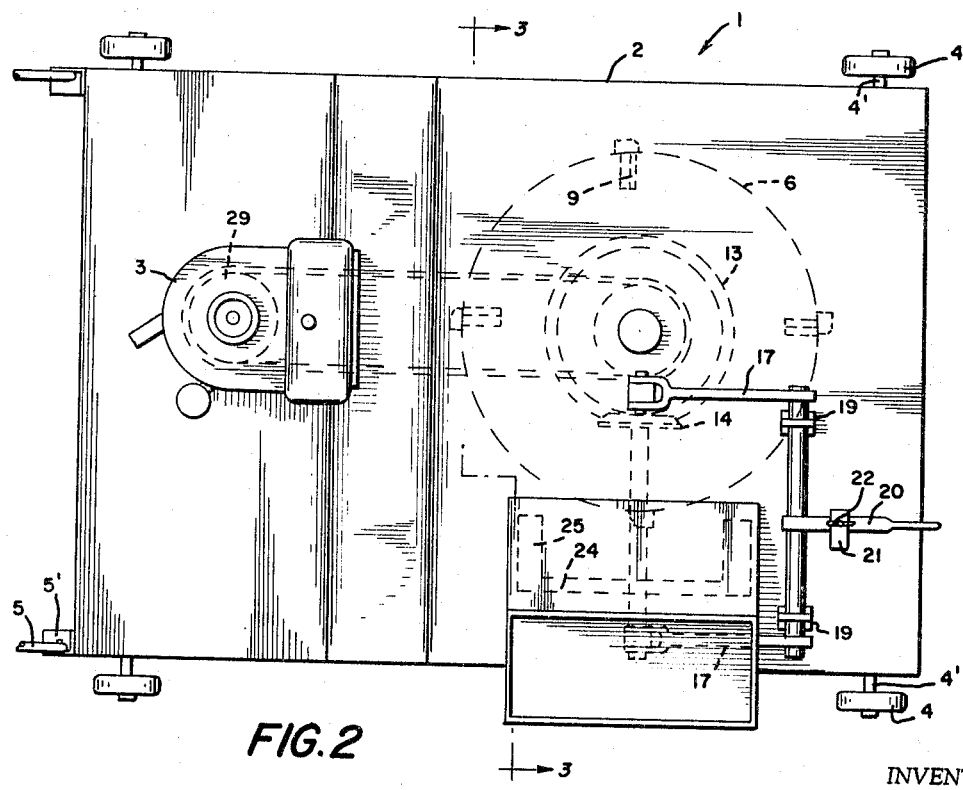
FIG. 2 is a top plan view of the combination lawn mower and snow remover.

With reference to the accompanying drawings, wherein similar characters of reference designate similar or identical elements and portions throughout the specification and the different views in the drawings, and with particular attention to FIG. 1, there is designated by the reference numeral 1, the general arrangement for the combination lawn mower and snow remover.

All of the working parts of the combination lawn mower and snow remover are mounted within a housing 2. A suitable driving unit such as a gasoline operated motor generally indicated by reference character 3 can be employed for the driving power for the unit although, of course, it is obvious that the driving unit can be substituted by an electric motor or other driving means.

Front and rear wheels 4 are mounted for rotation upon shafts 4' which extend through the lower portion of the housing 2 for supporting the housing and the elements therein above the ground during either the lawn mower operation or the snow removal operation. If desired, suitable adjustments can be provided for adjusting the wheels 4 and in this manner enabling the housing and the working parts thereunder to be elevated or lowered depending upon the position of the shafts 4' with respect to the housing 2.

The combination lawn mower and snow remover is of the conventional push type and is provided with a push handle 5 which is mounted for pivotal movement on bracket 6' which is secured in any manner to the rear portion of the housing 2.

A cutter disc 6 is mounted for rotation within the housing by means of a stub shaft 7 and clutch means 8. The stub shaft 7 and clutch means 8 are of conventional construction, although it should be set forth that the clutch 8 is of such construction as to permit the cutter disc 6 to disengage from the stub shaft 7 upon striking a solid object on the ground which would damage the cutter disc should it be permitted to continue rotation upon striking of the said hard object.

A series of vertical flanges 9 are either formed integrally with the cutter disc 6 or are secured thereto in any suitable manner. The vertical flanges 9 will assist in the removal of snow in a manner to be described more fully hereinafter.

A sprocket chain or like driving means indicated by reference character 10 is trained over a sprocket wheel 11 which is secured in a suitable manner to the stub shaft 7. The sprocket chain 10 extends rearwardly of the combination mower and snow remover and is trained over a driving member 29 which derives its rotating motion from the driving unit 3, aforesaid.

In driving engagement with clutch means 8 is a vertically extending shaft 12 which is suitably mounted within the housing and has secured thereto at the lower portion thereof, a bevel gear 13 which is adapted to cooperate with a smaller bevel gear 14 for driving a horizontally extending shaft 15 which is supported within the housing by means of a pair of brackets 16 which extend vertically within the housing 2, outwardly of the housing 2 through the slots 16' formed in the housing. A pair of generally horizontally extending lever arms 17 are pivotally connected to the aforesaid brackets 16 and are fixed to a rock shaft 18 which extends through a pair of brackets 19 which are mounted on the housing 2. A handle member 20 extends through a slotted bracket 21 and is fixedly secured to the rock shaft 18. A screw adjustment 22 is provided at the upper portion of the bracket 21 so that the limit of travel of the handle 5 and its associated parts can be regulated and also the screw adjustment 22 can, when the handle 20 has been depressed to the dotted line position shown in FIG. 1, prevent the handle 20 from returning to the full line position shown in FIG. 1. The reason for this will be explained hereinafter.

A hood 23 is permanently secured to the housing 2 in any suitable manner. The hood 23 houses a fan-like member 24 which is provided with a plurality of impeller blades 25. The hood 23 flares outwardly of the housing 2 as shown at 26 and the outlet end of the hood generally designated by reference numeral 27 is intended to direct the snow away from the housing 2 as it is forced through the hood by means of the fan-like member 24.

As will be shown by reference character 15', the hood is provided with slots which will permit the shaft 15, bevel gear 14 and fan-like member 24 to be capable of being lifted upwardly upon actuation of the handle 20 so as to disengage gear 14 from gear 13. Obviously, upon disengagement of the gear 14 from gear 13, the fan-like member 24 ceases rotation when the sprocket wheel 11 and sprocket chain 10 derive their power from the drive member 29 when the driving unit 3 is in operation.

As will be obvious, when it is desired to employ the combination rotary lawn mower and snow remover as a plain grass cutter, the handle 20 is depressed to the position shown in dotted lines in FIG. 1 and the adjustment screw 22 is brought in contact with handle 20 so as to maintain the handle in the depressed position. By depressing the handle 20, the rock shaft 18 to which the handle is secured is caused to rotate and in so doing, it elevates the horizontally extending lever arms 17 which in turn cause elevation of the brackets 16, shaft 15, bevel gear 14 and the fan-like structure 24.

It will be evident that during the summer months, the handle can be maintained in the aforesaid depressed condition so that the fan-like member does not rotate and the combination rotary lawn mower and snow remover can be employed as a lawn mower only.

When it is desired to employ the apparatus of the instant invention as a snow remover, the handle 20 is caused to return to the position shown in full lines in FIG. 1 and in so doing, the entire parts associated therewith as explained above, are caused to lower within the housing and to thereby cause bevel gear 14 to engage with bevel gear 13 so that upon rotation of gear 13, a rotary motion is imparted to the fan-like member 24. The gear 14 being of much smaller size than bevel gear 13 as shown in the drawings, the speed of rotation of the fan-like member will be relatively high thereby causing the snow which has been fed to the fan-like member by means of the vertical flanges 9 on the cutter disc to be forced outwardly through the hood.

The cutter members 28 which are secured to the cutter disc 6 are of conventional construction and it can be stated that they are of the well known generally triangularly shaped cutters which can be easily replaced on the cutter disc either for resharpening or for a complete replacement thereof.

It will therefore be seen that I have provided a combination rotary grass cutter and snow remover which is all combined in one unit and that by the simple manipulation of the handle which is permanently secured to the combination mower and snow remover, the device of the present invention can be employed in the summertime as a grass cutter and in the wintertime, by a simple manipulation of the handle 20, the lawn mower can be converted into a snow remover with relative ease and without having to make attachments to the lawn mower in order to convert the same into a snow remover such as has been attempted by others in the past.

It will be obvious that modifications of the disclosed mower and snow remover will be apparent to those familar with and skilled in the art without departing from the spirit and scope of this invention as defined in the appended claims taken in conjunction with the description and drawings set forth.

From the foregoing description, it will be apparent that there has been disclosed an apparatus which can be converted from a lawn mower to an effective snow remover with a minimum of effort and modification due to its simplified construction.

Having described the invention, what I claim is:

1. An apparatus for cutting grass and removing snow, comprising a housing, a grass-cutting disk carried by said housing, power means for rotating said disk, a hood carried by the housing, a fan within said hood, means for rotating said fan including said power means and a pair of meshing gears driven thereby, and means carried by said housing operable to engage and disengage one of said gears with the other gear whereby the apparatus operates as a grass cutter by action of the cutting disk when the gears are disengaged and as a snow remover by action of the fan when the gears are engaged.

2. An apparatus as set forth in claim 1 wherein the disk is provided with upper flanges on the upper face thereof to direct the snow towards the fan when the apparatus is used as a snow remover.

3. The combination as set forth in claim 1 wherein said means for causing engagement of said gears comprises a rockable member.

4. The combination as set forth in claim 3 wherein said rockable member is capable of being locked in a downward position.

5. The combination of claim 3 wherein the engageable and disengageable gear and said fan move in unison when said rockable member is moved from an up to a down position.

References Cited by the Examiner

UNITED STATES PATENTS 1,588,745  6/1926  Kear et al.
3,142,913  8/1964  Jacob _____ 37—43

EVON C. BLUNK, *Primary Examiner.*

A. C. HODGSON, *Assistant Examiner.*